July 2, 1957 R. F. McLEAN ET AL 2,797,951
AERODYNAMIC BRAKE FOR MOTOR VEHICLES
Filed Jan. 13, 1954 2 Sheets-Sheet 1

INVENTORS
Robert Schilling &
BY Robert F. McLean
C. H. Sibbe
ATTORNEY

July 2, 1957    R. F. McLEAN ET AL    2,797,951
AERODYNAMIC BRAKE FOR MOTOR VEHICLES
Filed Jan. 13, 1954    2 Sheets-Sheet 2
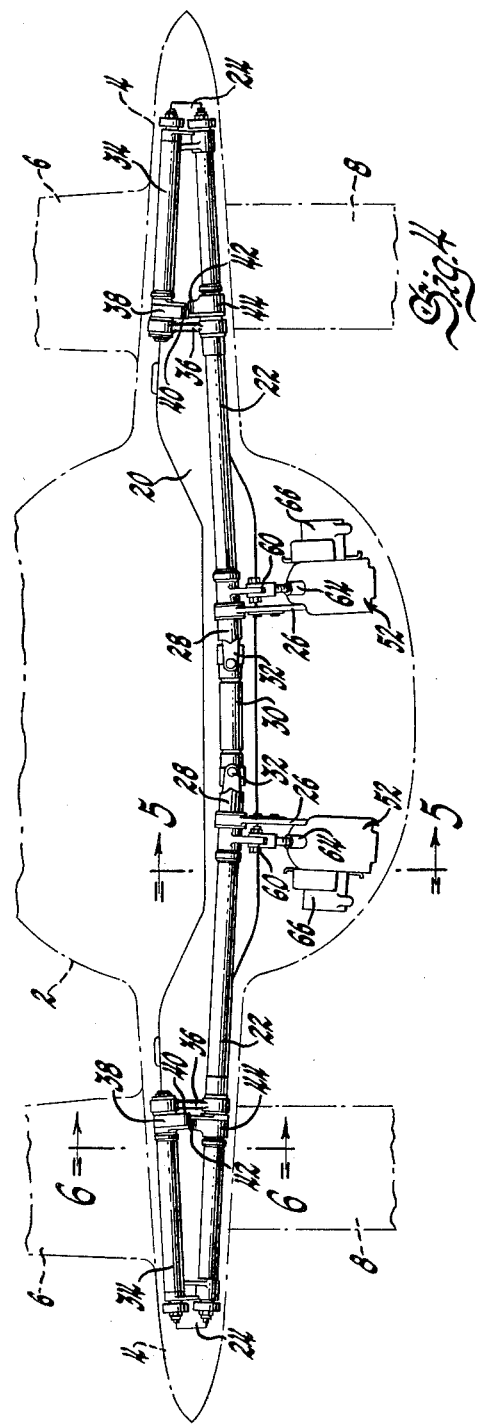
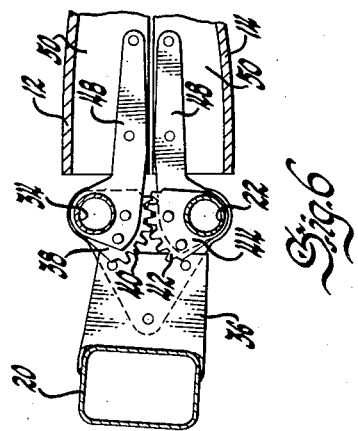
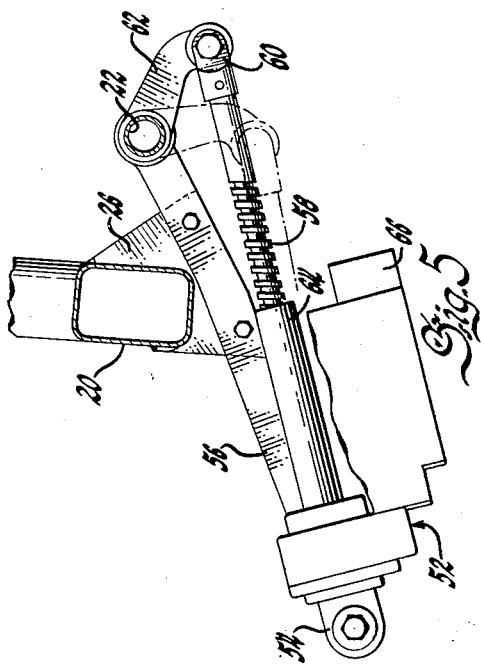
INVENTORS
Robert Schilling &
BY Robert F. McLean
C. H. Dibble
ATTORNEY

United States Patent Office 2,797,951
Patented July 2, 1957

2,797,951

AERODYNAMIC BRAKE FOR MOTOR VEHICLES

Robert F. McLean, Oak Park, and Robert Schilling, Bloomfield Hills, Mich., assignors to General Motors Corporation, Detroit, Mich., a corporation of Delaware Application January 13, 1954, Serial No. 403,854

4 Claims. (Cl. 296—1)

This invention relates to brakes and more particularly to aero-dynamic brakes of the type adapted for use on high-speed land vehicles.

As a result of progressively increased speeds attainable by land vehicles, conventional wheel brakes have become inadequate for controlling deceleration, particularly at speeds in excess of 100 miles per hour. Accordingly, it is desirable that other means be provided for controlled reduction of vehicle speed. Since conventional wheel brakes perform satisfactorily at low speeds, it is preferable that the means for braking at high speeds be adapted to function independently of the conventional brakes and thus be available for use either separately or to augment the conventional braking system.

Ordinarily, high speed vehicles are carefully streamlined to reduce air drag to a minimum. However, by providing controlled means for disrupting the normally streamlined configuration of the vehicle body, substantial air drag may be induced which tends to rapidly decelerate the vehicle, especially at speeds in excess of 100 miles per hour. While the decelerating effect of air drag below 100 miles per hour rapidly diminishes, conventional wheel brakes are thereafter sufficiently effective to accomplish controlled deceleration of the vehicle to a stop.

An object of the present invention is to provide remotely controlled aero-dynamic braking means for high speed land vehicles.

Another object of the present invention is to provide remotely controlled aero-dynamic braking means for high speed land vehicles which are operable both independently and in concert with conventional vehicle wheel brakes.

Yet another object is to provide a remotely controlled air drag brake which is normally streamlined in a horizontally extending plane and is operable to extended positions above and below a normally streamlined plane whereby maximum drag is induced without producing vertical lift or dive.

A further object is to provide a brake of the stated character which occupies a relatively small horizontal surface area.

A still further object is to provide a brake of the type described wherein the resultant lifting or depressing force of the drag brake may be initially varied a predetermined amount while retaining optimum drag.

These and other objects of the invention will become apparent as reference is had to the accompanying specification and drawings wherein:

Fig. 4 is a rear elevational view showing the form and arrangement of the brake actuating mechanism, the contour of the vehicle body being shown in dotted lines.

Fig. 5 is a fragmentary side elevational view looking in the direction of arrows 5—5 of Fig. 4, showing the screw jack brake actuator.

Fig. 6 is a fragmentary side elevational view looking in the direction of arrows 6—6 in Fig. 4, showing the form and arrangement of the cooperating flap supporting arms.

Figure 1:
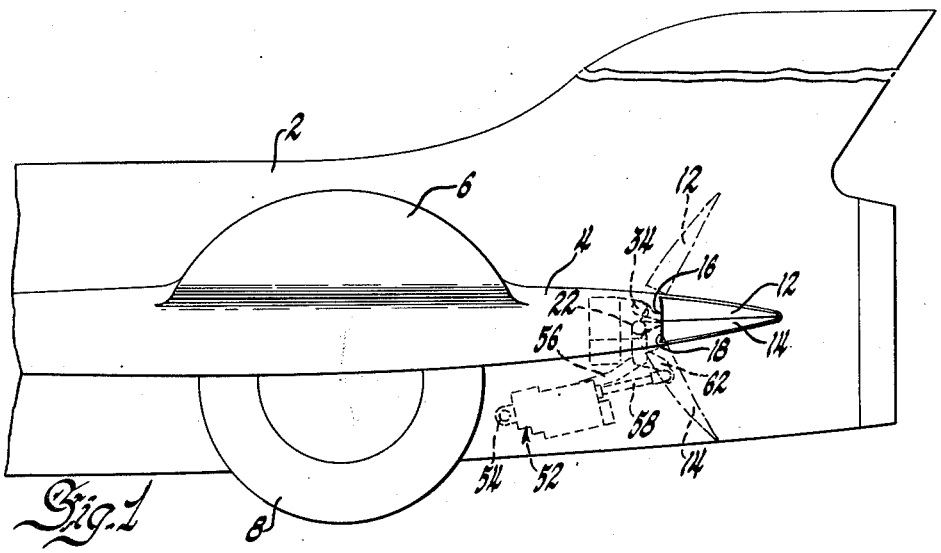
Fig. 1 is a fragmentary side elevational view of a portion of a vehicle showing the form and location of the invention with reference to the body contour, the invention being shown in operated position in dotted lines.
Figure 2:
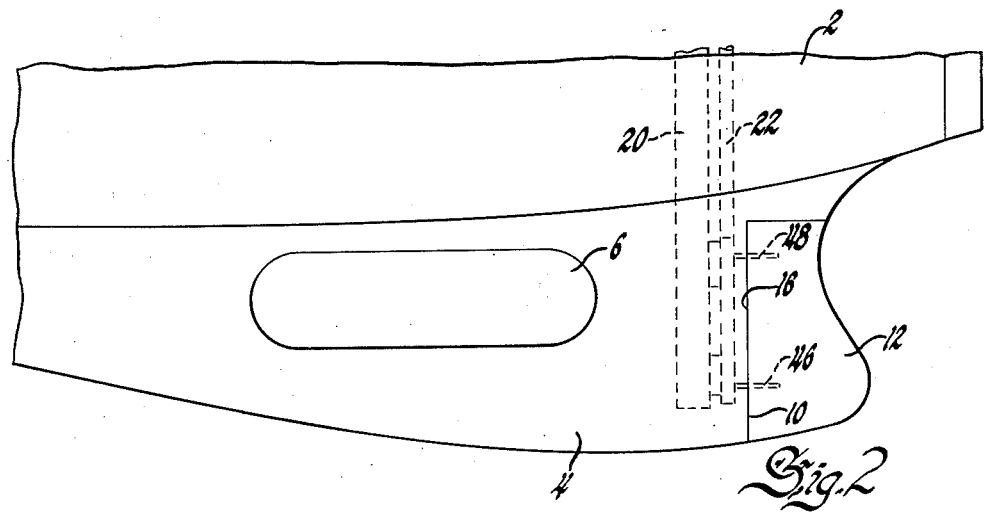
Fig. 2 is a fragmentary plan view of a portion of the vehicle illustrated in Fig. 1, further showing the location of the invention.
Figure 3:
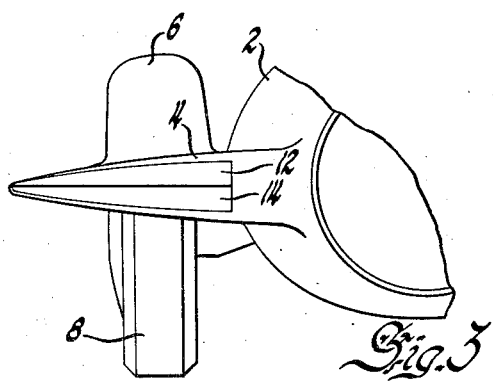
Fig. 3 is a fragmentary rear elevational view of the vehicle.

Referring now to the drawings and particularly Figs. 1 and 2, there is illustrated the rear portion of a generally cylindrical longitudinally extending vehicle fuselage 2 having laterally extending horizontal fins 4 which are integral and blend into the fuselage 2. Intermediately thereof, horizontal fins 4 are provided with upwardly deformed bubbles 6 which constitute the housings for the rear vehicle wheels 8. Pivotally secured at the notched trailing edges 10 of horizontal fins 4 are mating rearwardly tapering flap members 12 and 14 which are adapted for vertical swingable movement in opposite directions from a normally horizontal abutting relation. As seen best in Fig. 1, when flaps 12 and 14 are in closed position, the forward edges 16 and 18 thereof closely abut the trailing notched edges 10 of fins 4 and provide a continuation of the smooth tapering form of the fins. While only one side of the vehicle is illustrated, it will be understood that all structures described are duplicated on the opposite side of the vehicle and are identical in all respects.

To control the position of upper and lower flaps 12 and 14 in accordance with the present invention, a power driven transversely extending shaft mechanism is secured on the rear frame cross member 20.

As seen best in Fig. 4, a pair of rotatable shafts 22 extend transversely outwardly from the midline of the vehicle and are rotatably secured at their opposite ends to the frame cross member 20 by brackets 24 and 26. At their respective inner ends 28, shafts 22 are operatively coupled to a relatively short shaft 30. Since shafts 22 are respectively inclined slightly upwardly from the horizontal to rotate on an axis parallel with the lower surface of the fins 4, universal joint connections 32 are provided between the ends 28 of shafts 22 and the opposite ends of shaft 30. Vertically offset from the outer portions of shafts 22 are a second pair of rotatable shafts 34, the opposite ends of which are rotatably supported by brackets 24 and 36 secured on cross member 20. At their inner ends, shafts 34 are provided with downwardly depending portions 38 having gear segments 40 formed thereon which are adapted for meshing engagement with similar gear segments 42 formed on upwardly extending portions 44 formed intermediately of shafts 22. As will be evident from Fig. 4, shafts 34 are inclined downwardly from the horizontal to rotate on an axis parallel with the laterally outwardly tapering upper surface of fins 4.

As seen best in Figs. 1 and 6, each shaft 22 and 34 is provided with integral spaced rearwardly extending legs 46 and 48 which are normally aligned in horizontally parallel relation. Flaps 12 and 14 are provided with integral ribbed longitudinally extending portions 50 which are secured to legs 46 and 48, respectively, by any suitable means, as for example, machine bolts. As will be apparent from Fig. 6, when lower shafts 22 are rotated clockwise, the meshing segmental gears 40 and 42 operate to cause shafts 34 to rotate counterclockwise. Consequently, flap 12 swings angularly upwardly while flap 14 is swinging angularly downwardly a corresponding number of degrees. It will, of course, be understood that the relative inclination of flaps 12 and 14, in open position, need not necessarily be similar. Should unequal angles of inclination be desired, the ratio of the respective gear segments 40 and 42 may be modified to provide the desired ratio of inclination.

In order to actuate flaps 12 and 14, a pair of motor driven screw jacks 52 are pivotally mounted at their forward ends 54 on brackets 56 which extend below and slightly ahead of frame cross member 20. As seen best in Fig. 5, the terminal end of each drive screw 58 is connected by a pin and clevis 60 to a relatively short integral lever 62 secured to shafts 22 and is operative to rotate the same when driving screw 58 is moved axially in screw jack body 64 by the electric motor 66. Electric motor 66 is energized by a suitable source of power, not shown, which is controllable from any desired remote point, as for instance by a switching means convenient to the vehicle operator. While two simultaneously operable screw jack assemblies are shown in the disclosed embodiment, it will be understood that it is merely for the purpose of providing adequate power in the limited space available, and, therefore, a single jack may be employed in any installation where adequate space is available.

In order that the invention may be more clearly understood, a description of the mode of operation will be given. Assuming the vehicle to be traveling at speeds in excess of 100 miles per hour, the vehicle operator initially decelerates the rate of travel by energizing the electric motors 66 by a suitable control, not shown. Motors 66 actuate drive screws 58 linearly forwardly causing arms 62 to rotate clockwise. Since arms 62 are connected to shafts 22, the latter rotate clockwise and swing the streamlined flap portions 14 to an angularly downwardly inclined position. Simultaneously, flaps 12 secured to shafts 34 swing angularly upwardly a corresponding number of degrees responsive to the driving action provided by gear segments 40 and 42. The flaps are thus opened to the position shown in dotted lines in Fig. 1 and thereafter cause substantial disruption of the normal air flow over the streamlined surfaces of the fins 4. By virtue of the double action or two way inclination of flaps 12 and 14, optimum air flow disruption is accomplished by displacement of the minimum horizontal surface area. Thus displacement of a relatively small horizontal surface area is operative to induce air drag approximately double that which would be obtained by a single inclined flap of the same horizontal surface area. In addition, side effects of the flaps, such as lift are virtually eliminated. However, it should be noted that with a device of this type the relative angle of inclination of flap 12 may be increased and thus take advantage of the downward forces resulting to aid in maintaining traction of rear wheels. As pointed out previously, when the vehicle speed is diminished to approximately 100 miles per hour, the braking effect of flaps 12 and 13 rapidly dissipates. However, in the intermediate range both the flap brakes and the conventional wheel brakes may be used simultaneously. Since the flaps have little, if any, effect on the operation of the vehicle at low speeds, return of the flaps to the streamlined position may be accomplished either while the vehicle is in motion or after coming to rest.

From the foregoing, it will be seen that a novel and highly effective braking mechanism has been devised which is simple in construction and efficient in operation. While the device is intended primarily for use on specialized high speed vehicles, it will be seen that the operation thereof is extremely effective while in no way adversely effecting the handling characteristics of the vehicle.

While but one embodiment of the invention has been shown and described, it will be apparent that other changes and modifications may be made therein without departing from the invention. It will therefore, be understood that it is not intended to limit the invention to the embodiment shown, but only by the scope of the claims which follow.

We claim:

1. An aerodynamic brake for a motor vehicle having a fixed streamlined main body, comprising laterally spaced pairs of horizontally extending body portions mounted for swingable movement about laterally spaced transverse axes adjacent said main body, and means for displacing said horizontally extending portions whereby said vehicle is decelerated by air drag, said means comprising a shaft mechanism having rotation reversing means adapted to rotate one of each of said pairs of horizontally extending portions in one direction and to rotate the other of each of said horizontally extending portions in the opposite direction simultaneously.

2. The structure defined in claim 1 wherein said means for displacing said swingable portions is adapted to provide equal opposite movement.

3. In a road vehicle having a streamlined main body, an aerodynamic brake comprising laterally spaced upper and lower flaps, said upper and lower flaps being normally horizontally extended and in vertically registered relation, each flap having an outer surface normally blending with the adjacent surface of said main body, means rotatably connecting the forward edge of each of said flaps with the trailing edge of said body, a flap actuating mechanism mounted transversely of said vehicle, said mechanism comprising a pair of shafts, one of said shafts being rotatable by power operated means, the other of said shafts being disposed in generally parallel relation with said first mentioned shaft, and means interconnecting said first and second shafts and adapted to rotate said second shaft in a direction opposite to that of said first mentioned shaft.

4. In a road vehicle having a streamlined main body, an aerodynamic brake comprising laterally spaced pairs of flaps, each of said pairs comprising an upper and lower member, said members being normally horizontally extended in vertically registered relation, each of said members having outer surfaces normally blending with the adjacent surfaces of said main body, means rotatably supporting the forward edges of each of said members adjacent the trailing edges of said body, said means including transversely extending shaft means, said shaft means comprising a first set of generally aligned shafts having a common connection therebetween and a second set of shafts offset vertically from said first set of shafts, means connecting said first and second set of shafts whereby rotation of said first set in one direction imparts reverse rotation to said second set to cause said upper and lower members to open in opposite directions, and means for actuating said first set of shafts.

References Cited in the file of this patent

UNITED STATES PATENTS

| 609,789 | Capewell | Aug. 30, 1898 |
| 1,710,938 | McLauchlan | Apr. 30, 1929 |
| 2,665,137 | Kamm | Jan. 5, 1954 |

FOREIGN PATENTS

| 876,146 | France | July 20, 1942 |
| 887,384 | France | Aug. 9, 1943 |
| 710,740 | Germany | Sept. 19, 1941 |
| 494,664 | Great Britain | Oct. 28, 1938 |
| 652,590 | Great Britain | Apr. 25, 1951 |